May 20, 1969  J. HURST  3,444,999

VIBRATORY MOUNTING FOR SIEVES AND LIKE APPARATUS

Filed Dec. 20, 1965

INVENTOR
JUSTIN HURST
BY Mawhinney & Mawhinney
ATTYS

United States Patent Office 3,444,999
Patented May 20, 1969

3,444,999
VIBRATORY MOUNTING FOR SIEVES AND LIKE APPARATUS
Justin Hurst, Mayfield, England, assignor to Russell Constructions Limited, London, England, a British company
Filed Dec. 20, 1965, Ser. No. 515,057
Claims priority, application Great Britain, Mar. 18, 1965, 11,599/65
Int. Cl. B07b 1/28
U.S. Cl. 209—316      8 Claims

ABSTRACT OF THE DISCLOSURE

This application discloses a vibratory mounting for a sieve or other vibratory apparatus. A vibratory frame having an annular seating is mounted on a resilient annulus which rests on a similar annular seating on a stationary frame. An out-of-balance weight is mounted on the vibratory frame to vibrate it with circular vibrations having at least a component in the plane of the annulus.

---

This invention comprises improvements in or relating to vibratory mountings for all kinds of apparatus which may require to be vibrated, such as sieves or strainers, ball mills, shaking tables, ore concentrators, devices for shaking and packing powders in containers and the like.

It is well known in sieves to mount a sieve-frame on a series of springs, or to suspend it on rods which are flexibly supported, and to cause it to vibrate with a circular movement in a horizontal plane either by driving it by an eccentric on a circular shaft or by causing an out-of-balance weight mounted on the frame to be rotated at high speed. The springs or rod-suspensions thus employed, in order to operate successfully at high speeds over long periods of time, require to be elaborately anchored, and the constructions are heavy, expensive and, even so, often unsatisfactory. It is an object of this invention to provide a lighter less expensive and more satisfactory construction.

The present invention provides in or for a screen or other vibratory apparatus the combination of a vibratory frame, which is to be vibrated with a circular motion, a planar seating thereon, a base having a planar seating parallel to and spaced from the seating in the vibratory frame, a readily deformable filling between the two seatings, an out-of-balance weight on the frame which is rotatable in a plane parallel to the planes of the seatings, or at least has a component of its plane of movement parallel to said planes of the seatings and means for rotating the out-of-balance weight.

Preferably the seatings are ring-shaped and the deformable filling forms a complete ring between them. It may take the form of a flexible tubular ring, such for example as the inner tube of a pneumatic tyre, filled with a fluid, which be a gas such as air, or a liquid such as water.

The seatings may be spaced apart by being in two planes one above the other with the frame which is to be vibrated carrying the upper seating so that the deformable material bears its weight. This vibration may be either in a flat plane, or it may have a vertical component and the latter may be derived either from the relative arrangement of the seatings, or from the mounting and disposition of the out-of-balance weight. In one form of apparatus according to the invention, the seatings form complete or segmented rings and there is a plurality of out-of-balance weights located round about or within the seatings and operated in a synchronised phase relationship with one another.

It has previously been proposed to mount sieves and the like on flexible mountings consisting of hollow inflated rubber members. The distinguishing feature of the present invention is that the deformable filling is displaced laterally by the vibration, with a shearing action, and that the vibration is circular or at least has a circular component due to the relation of the plane of rotation of the out-of-balance weight or weights to the plane of movement of the vibratory frame.

The following is a description, by way of example, of certain forms of vibratory mounting according to the invention:

Figure 1:
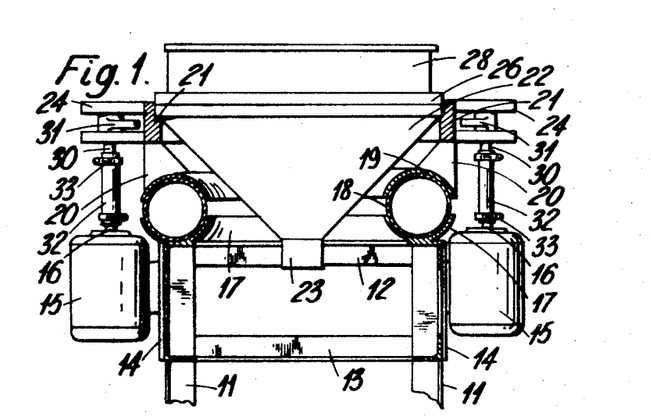
FIGURE 1 is a diagrammatic side elevation of one form of sieve in accordance with the invention.

Referring to FIGURE 1, a base is provided, consisting of four angle-iron legs 11, united by a square angle-iron frame at the tip 12 and by horizontal angle-iron tie-bars 13 at a lower level. Welded between the frame and the tie-bars, in the centre of opposite sides, is a vertical plate 14 and each of the vertical plates 14 supports an electrical motor 15, arranged with its shaft 16 vertical.

On the upper face of the square frame 12 there is welded a seating 17 made from a sheet metal ring the edges of which are curved upwardly, so that in section the ring 17 is almost semicircular. In this curved seating there rests a gently-inflated rubber ring 18, like the inner tube of a motor-car tyre. On the rubber ring there rests another metal seating 19 like the first seating 17, but inverted. The upper seating 19 carries a number of vertical fins 20, welded in place, and having horizontal upper edges which support a stout horizontal flat metal ring 21 forming a holder for a stainless-steel funnel 22. The funnel 22 is conical, with a downward discharge pipe 23, in the centre and it can be lifted out of its holder 21 for cleaning when desired. The metal ring 21 which forms a holder for the funnel has, welded outside its outer edge at two places, brackets 24 of heavy channel-section steel, disposed with upper and lower flanges facing outwardly. Within this ring 21 and above the funnel 22 there may be placed a circular sieve-frame 26 and the ring 21 carries dogs 27 for clamping the sieve in position. Standing up from the edges of the sieve is a circular thin sheet-metal rim 28 to retain in place any powdered material which may be placed upon it for treatment. The sieve-surface is indicated at 29, FIGURE 2.

Figure 2:
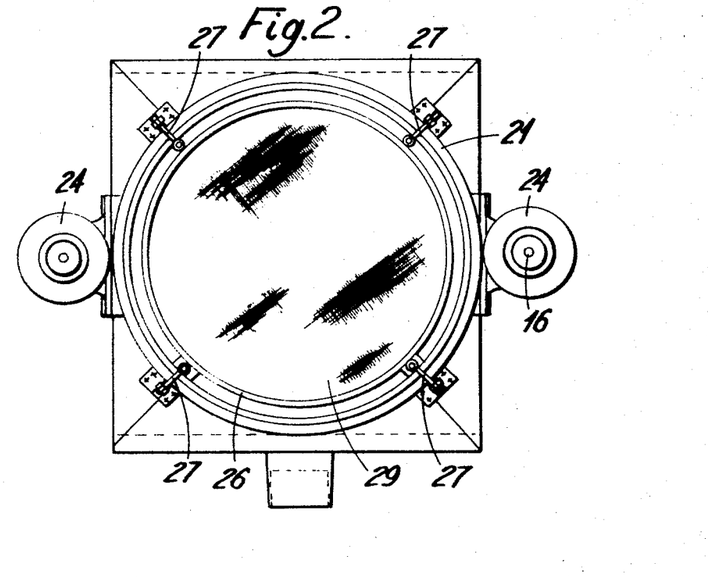
FIGURE 2 is a plan of the same.

The ring 21 on which the sieve-frame 26 is mounted forms the frame which is to be vibrated. In order to effect the vibration, the brackets 24 have upper and lower outwardly-projecting arms which each carry a horizontal ball-bearing and between the ball-bearings a short vertical shaft 30 is mounted, on which is an out-of-balance weight 31. The shafts 30 are arranged in line with the two motors 15 mounted on the base 11 and are connected to them by short lengths of stout rubber tube 32 and hose-clips 33, the rubber tubes 32 acting as flexible couplings. It is necessary to synchronise the motors 15 and out-of-balance weights 31 so as to arrange for the out-of-balance weights to take up and remain in a predetermined phase relationship with each other. This may be done by interconnecting them, either by sprockets and chains or a notched belt (as hereinafter described) or by connecting shafts and gearing. If desired however, only one motor and out-of-balance weight may be used. It will be noted that the sieve 29 and the vibrating frame 21 are not fixed in place except by resting on the inflated rubber tube 18. It has been found that this mounting is quite secure, even at very high speeds of rotation of the out-of-balance weights, up to nearly 3,000 revolutions per minute.

The following figures give the results of a trial of a sieve constructed as above described, using only one out-of-balance weight at a speed of 2850 revolutions per minute and a stainless steel-mesh sieve of 150 meshes per lineal inch. The material treated was potato starch and comparative figures are given for a standard rod-mounted sieve, run at its regular speed of 1450 revolutions per minute. In each case, flour was fed on to the sieve surface continuously for one minute and the weight of the throughput measured. Several runs were made on the standard machine first and then the sieve frame 26 with its sieve 29, which had become blinded by the starch on the standard machine, was transferred as it was to the machine according to this invention, and tests continued there with the same material and for the same time at each run. The following table shows the results:

TABLE

| Test No. | Standard machine, throughput (lbs.) | New machine, throughput (lbs.) |
| --- | --- | --- |
| 1 | 17 | 24 |
| 2 | 4 | 32 |
| 3 | 3 | 31 |
| 4 | 2 | 34 |
| 5 | 2 | 35 |
| 6 | 2 | 36 |
| 7 | 2 | 36 |

Starch flour is very liable to blind the sieve and it will be noted that the sieve on the standard machine rapidly became blinded and when blinded, as in Tests 2 to 7 inclusive, had very low output. This machine could not owing to its heavy construction be run faster than 1450 r.p.m. The new machine, although it was started with a blinded sieve, rapidly cleared itself, and the output rose with each run to a maximum of 36 lbs. per minute. Moreover the horsepower required for the new machine was only ⅓ H.P. against ¾ H.P. for the old machine.

It has been found that the air-pressure in the inflated tube has a distinct bearing on the output of the machine. Using a machine of similar proportions to those shown in FIGURES 1 and 2 and a sieve surface 22 inches in diameter and made of stainless steel mesh of 100 wires to each lineal inch, at 2900 revolutions per minute of the out-of-balance weights, standard flour was treated on the sieve at various different pressures of inflation, and the following results obtained:

| Test No. | Air pressure in inflated tube (p.s.i.) | Throughput in 1½ minutes (lbs.) |
| --- | --- | --- |
| 1 | 1 | 14 |
| 2 | 1½ | 16½ |
| 3 | 2 | 17½ |
| 4 | 2½ | 19 |

When the air pressure was further increased the machine vibrated and output fell, but it was found there was a stage at 4 lbs. per square inch when the machine ran well but the output was only the same as at 2½ lbs. per square inch, viz: 19 lbs. in 90 seconds. For these tests the rubber tube was covered with a nonelastic fabric sock to prevent it from bulging too much at the higher pressures. In any particular case, it is recommended that the best pressure for the machine and its load should be determined by a simple preliminary trial.

It is further possible to dilate the tube by means of a liquid instead of a gas. If just enough water to dilate the rubber tube fully is pumped in, it is found that, results very similar to those using air pressure at, say, 1½ lbs. per square inch, are obtained.

Various modifications are contemplated as possible within the scope of the invention, and some of these are shown in the other figures.

Figure 3:
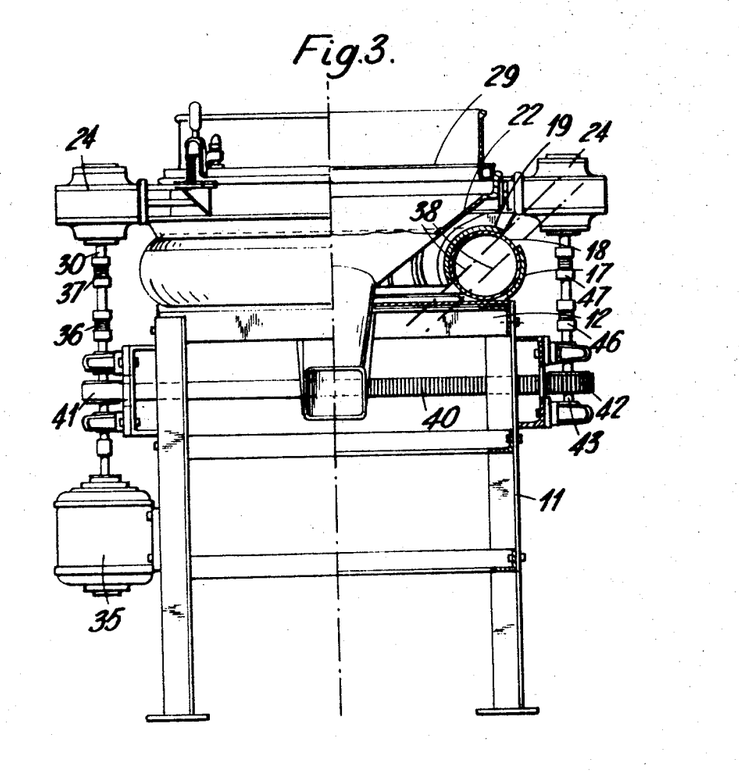
FIGURE 3 is a side elevation of another form.

Referring to FIGURE 3, this shows a frame 11 having a horizontal frame 12 which supports a ring-shaped seating 17. In this is seated an inflated rubber ring 18 and on this ring 18 there rests an upper seating 19 which supports a funnel 22 and sieve 29 in a similar way to the construction of FIGURES 1 and 2. As before there are brackets 24 which support rotatable out-of-balance weights, but in this case the weights are enclosed.

These are two main differences from the construction of FIGURES 1 and 2. In the first place the outer wall of the seating ring 17 is extended upward and the inner wall of seating 19 is extended downward, so that the central zone dividing between them is inclined instead of being horizontal, as shown by the two chain-lines 38. In the second place there is only a single motor 35 for driving both out-of-balance weights. This motor is connected, through flexible couplings 36, 37 to the out-of-balance weight on the shaft 30 which is directly above it. It is connected to the out-of-balance weight on the other side of the machine by a notched belt 40 running on appropriate sprockets 41, 42 and the sprocket 42 is mounted on a shaft 43 connected to the weight in the bracket 24 above it, by flexible couplings 46, 47 similar to the couplings 36, 37 in the left-hand side of the figure. Making the zone between the seatings inclined and conical as shown, causes the sieve to have a combined orbital and rocking movement which is sometimes advantageous in preventing blinding of the meshes of the sieve. The notched belt keeps the vibrators in synchronism.

Figure 4:
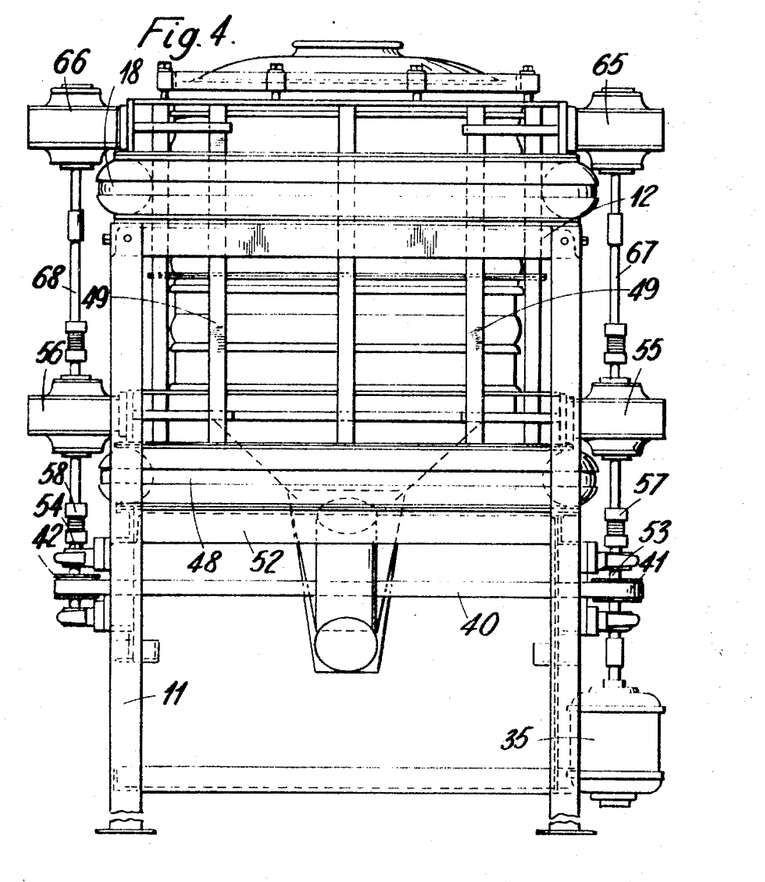
FIGURE 4 is a side elevation of a third form.
Figure 5:
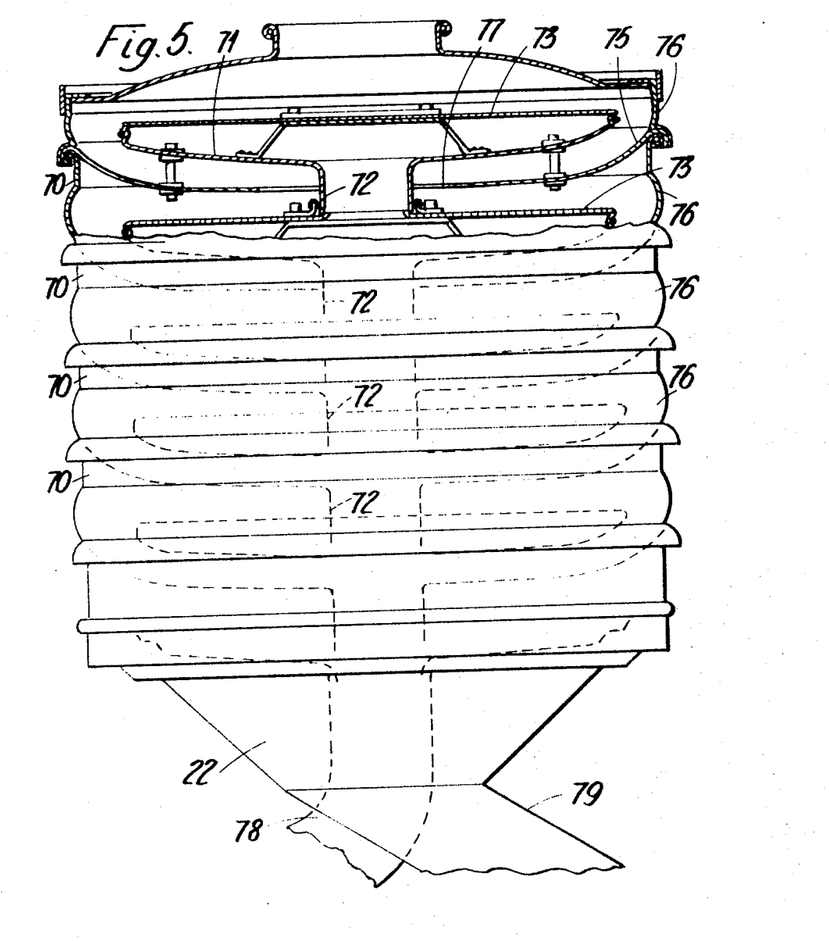
FIGURE 5 is a detail to a larger scale of the sieve assembly of FIGURE 4.

FIGURE 4 shows a machine with a frame 11 and a square horizontal upper frame 12 as before, but in addition there is a lower square horizontal frame 52. The upper frame has seatings and an air cushion 18 similar to FIGURE 1 and the lower frame has seatings and an air cushion 48. Between these seatings there is a framework 49 formed of vertical rods which unite the upper members of the seatings of the air cushions 18 and 48 and in this framework there is supported an assembly of sieves which is shown in more detail in FIGURE 5. The assembly is caused to vibrate in an orbital horizontal path by a motor 35 similar to the motor 35 in FIGURE 3 which drives two pulleys 41, 42 by means of a notched belt 40, as already described. The pulleys run on vertical shafts 53, 54 and drive out-of-balance weights in brackets 55, 56 attached to the lower part of the frame just above the air cushion 48. This drive takes place through flexible couplings 57, 58 on the pulley shafts 53, 54. In addition there are other brackets 65, 66 attached to the upper part of the frame and containing out-of-balance weights which are driven by shafts 67, 68 coupled to the shafts 57, 58 below them. As the out-of-balance weights are all kept in synchronism the whole assembly is capable of vibrating orbitally in a horizontal plane. A sieve assembly shown in FIGURE 5 consists of a number of units 70 mounted one on top of the other on the funnel 22. Each sieve assembly 70 comprises a flat funnel 71 having a central depending chute 72 and supporting a woven wire sifting septum 73. The funnel 71 is supported from a dish-shaped member 75 which is somewhat larger in diameter than the septum 73 and serves to catch the oversize. Above the dish-shaped member 75 there is an upstanding wall 76 which supports the dish-shaped member of the sieve section above it. The oversize falls through an aperture 77 in the member 75 on to the septum of the section below and is therefore re-screened. The undersize goes into the central chute 72 and eventually falls into an outlet chute 78. The final oversize falls into a separate outlet chute 79.

Figure 6:
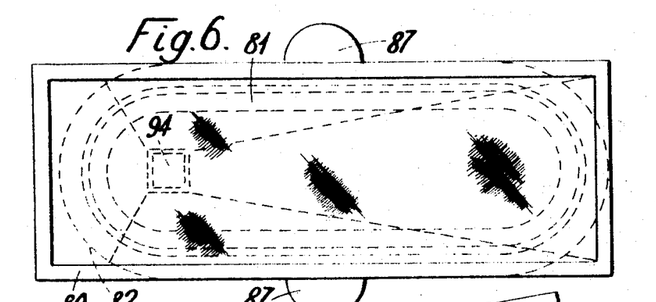
FIGURE 6 is a plan of a fourth type of sieve according to this invention.
Figure 7:
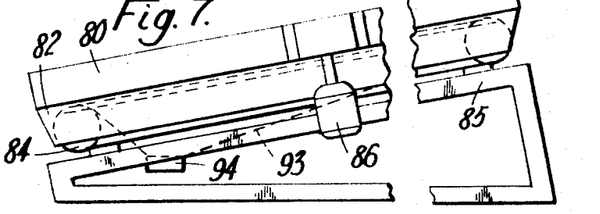
FIGURE 7 is a side elevation of the same.
Figure 8:
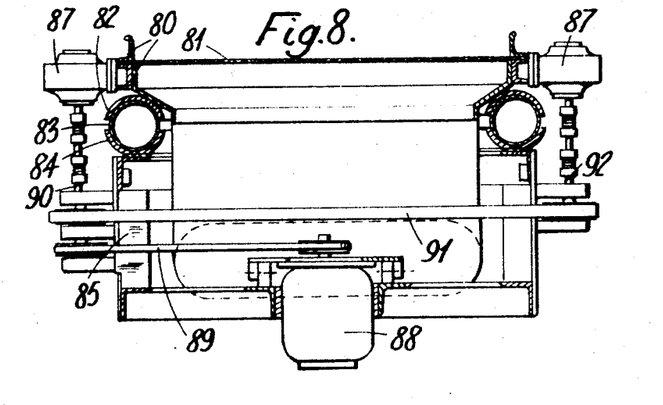
FIGURE 8 is a side elevation of a fifth form.

FIGURES 6, 7 and 8 show in diagrammatic form a support for a rectangular sieve comprising an outer frame 80 and a sifting septum 81. The underside of the frame 80 carries a seating 82 which is in the form of an elongated oval figure with flat sides and rests on an inflated rubber tube 83. This in turn rests on a lower seating 84 supported by an angle-iron framework 85 having an inclined upper surface.

The form shown in FIGURES 6 and 7 differs a little in detail from the form shown in vertical cross-section in FIGURE 8. In FIGURES 6 and 7 there are two motors 86 which drive out-of-balance weights enclosed in brackets 87 on the two sides of the said frame. In FIGURE 8, as before there are two brackets 87 which enclose out-of-balance weights but these are driven by a single motor 88 in the base of the machine which operates a belt drive 89 to a vertical shaft 90 coupled to one of the out-of-balance weights. There is a notched belt drive 91 to a second vertical shaft 92 which operates the other out-of-balance weight.

Below the frame 80 there is a funnel 93 leading to an outlet 94. This rectangular screen is intended for draining sludgy liquids and the water drains out at 94 while the solids pass over the lower end of the sieve.

Figure 9:
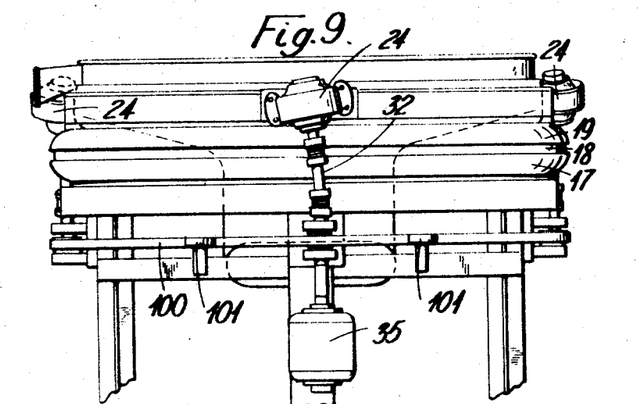
FIGURE 9 is an end view of another form.
Figure 10:
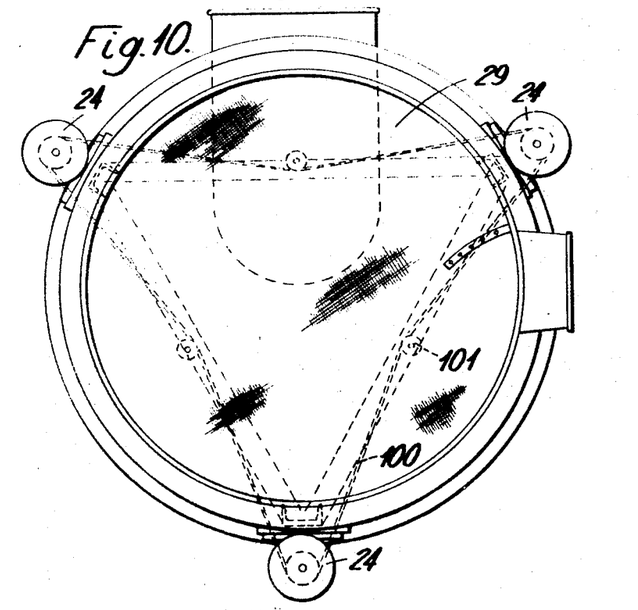
FIGURE 10 is a plan of the same.

FIGURES 9 and 10 show another version of a circular sieve having a septum 29 which is supported by a circular seating 19 from an inflated annulus 18 resting on a lower seating 17 in a similar way to FIGURES 1 and 2. The difference is that there are three brackets 24 containing out-of-balance weights and they are all set so as to be slightly inclined to the axis of the sieve 29. They are driven by shafts 32 and flexible couplings from a single motor 35 which is connected to all the shafts 32 by a notched belt drive 100. As can be seen from the plan FIGURE 10 the notched belt 100 is passed behind tensioning wheels 101 which help to ensure that there is no tendency to slip. The inclined disposition of the out-of-balance weights gives a combined orbital and rocking movement to the septum 29.

Figure 11:
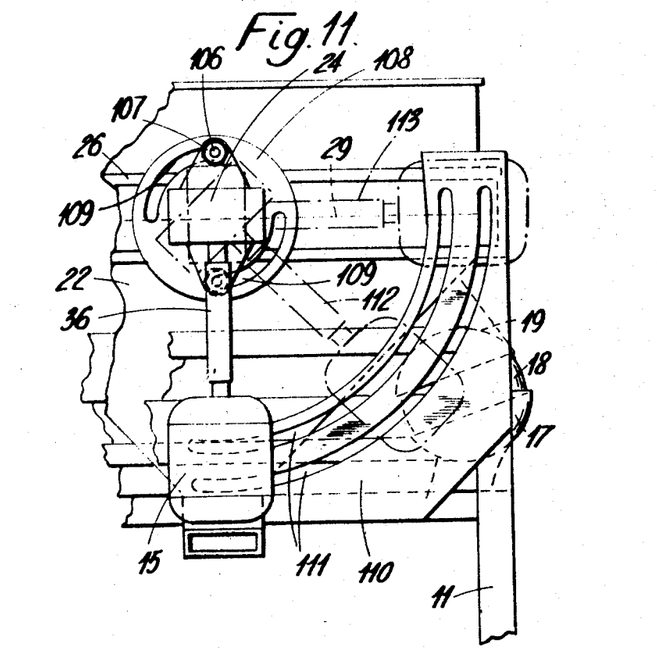
FIGURE 11 is a side elevation of an adjustable motor mounting.

FIGURE 11 shows a frame 11 which supports a lower seating 17 on which rests an inflated rubber ring 18 supporting an upper seating 19, the zone of division between the two seatings being inclined as in the case of FIGURE 3. On this structure there is supported a funnel 22 and a wire mesh screen 29 resting on a ring 26 as before. The out-of-balance weight in the bracket 24, however, instead of being attached directly to the ring 26 is secured by bolts and nuts 106, 107 to a circular back plate 108 on the ring 26 and the back plate is provided with quadrantal slots 109 which permit the angle of the shaft which drives the out-of-balance weight to be adjusted. A motor 15 drives the out-of-balance weight as before through a rubber flexible connection 36 and a motor is mounted on a plate 110 having quadrantal slots 111 which permit the assembly of motor and out-of-balance weight to be adjusted angularly, as shown by the chain line views 112, 113. It will be noted that in all the positions of adjustment shown, the out-of-balance weight has an orbital component of movement in the plane of the central zone of the rubber inflated ring 18.

Figure 12:
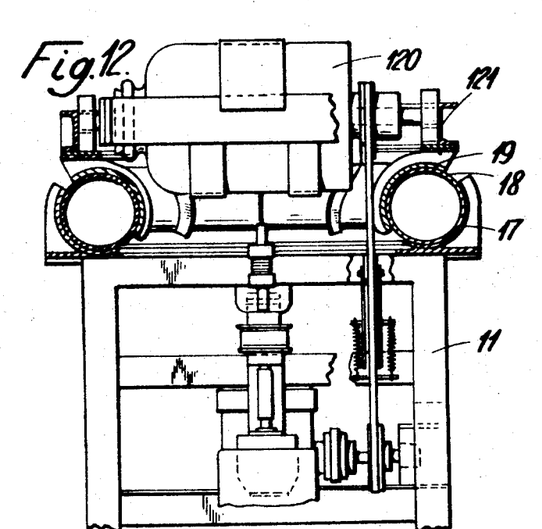
FIGURE 12 is an end elevation of a ball mill.
Figure 13:
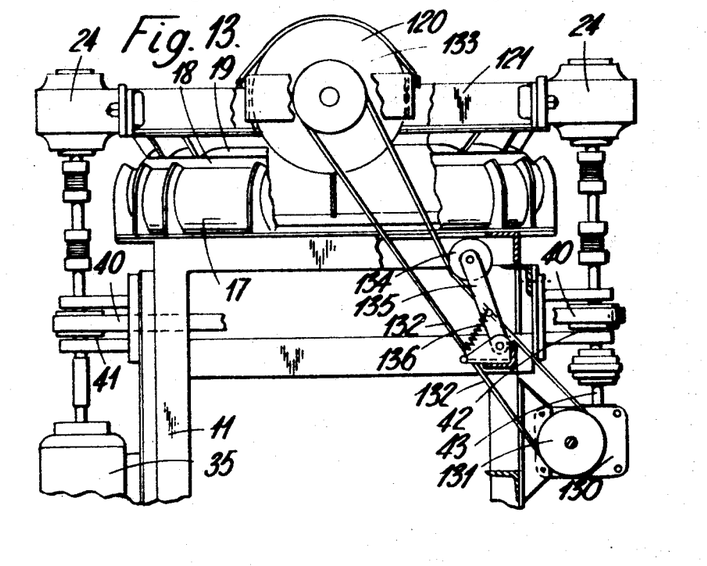
FIGURE 13 is a side elevation of the same.

Coming to FIGURES 12 and 13, these show an application of the same type of mounting to the support of a ball mill 120. As before there is a frame 11 which supports a seating 17 for an inflated ring 18 and the ring 18 supports an upper seating 19 on which is a frame 121. The frame 121 supports the ball mill 120 and the mill is able to rotate while it is being agitated by out-of-balance weights in brackets 24. There is a motor 35 which operates one of the out-of-balance weights directly and the other through pulleys 41, 42 and the notched belt 40. A second shaft 43 which is driven by the notched belt is also extended downwardly to the gear box 130 containing a reduction gear which operates a pulley 131 and drives the ball mill 120 through a belt 132 and a pulley 133. A jockey pulley 134 is carried by a lever 135 and is drawn by a spring 136 on to the back of the belt 132 to keep it taut.

Figure 14:
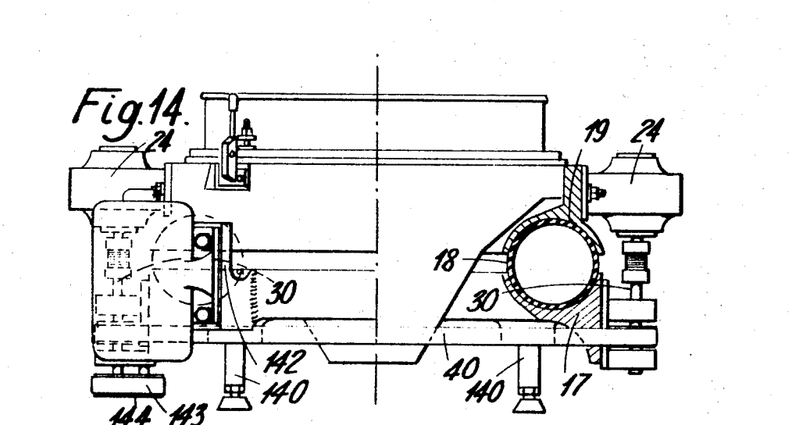
FIGURE 14 is a side elevation, partly in section, of a low built sieve.
Figure 15:
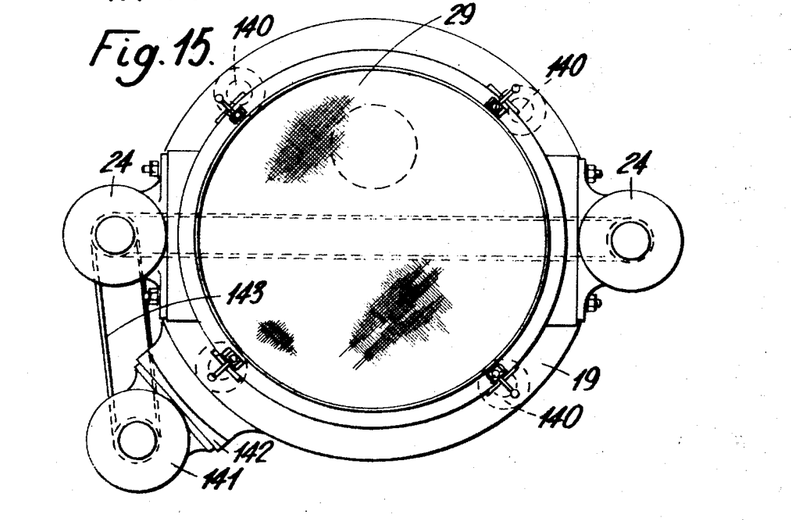
FIGURE 15 is a plan of the same.

Referring now to FIGURES 14 and 15 these show a machine which is low-built, so that it can stand close to floor level and receive, for example, drainings from a tank which owing to the low level of the straining septum, can flow on to it by gravity. This is possible with the present invention because, unlike previous constructions, long vertical suspension rods are not called for.

In these figures the inflated ring 18 and lower and upper seatings 17 and 19 are similar to what has already been described. Out-of-balance weights are located in casings 24 and are driven by shafts 30, kept in synchronism by a notched belt 40. The sieve 29 is similar to that shown in FIGURE 3. The difference is that the lower ring 17 forms part of a casting which acts as a circular frame member and rests on four short legs 140. The motor 141 is secured to a bracket 142 which stands up from the frame-member, and the drive belt 143 of the motor, and pulley 144 are below the motor close to the ground. This affords adequate length for the shafts 30 without requiring the casings 24 to be raised much above ground level.

Figure 16:
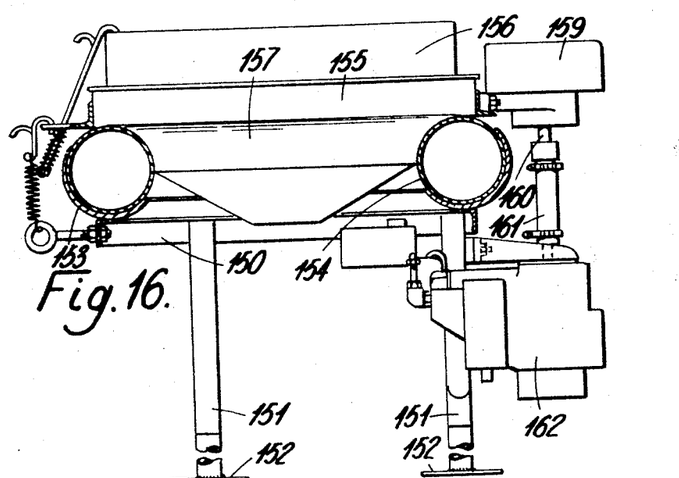
FIGURE 16 is a vertical section through a portable sieve driven by an internal combustion engine.
Figure 17:
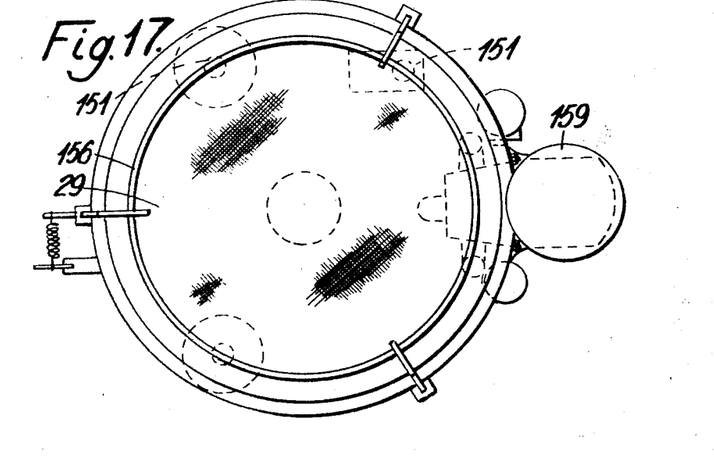
FIGURE 17 is a plan of the same.

FIGURES 16 and 17 show a machine which is designed so as to be as light as possible and readily portable. A light angle-iron ring 150 rests on tubular legs 115, the feet 152 of which are telescopic so as to be adjustable for eneven ground. On the ring 150 there is welded a hollow steel ring 153 and this supports a rubber tube 154 on which rests a casing 155 which supports a frame 156 for a sieve 29. The casing 156 is shaped to form a hollow ring portion 157 which rests on the rubber tube 154. It will be noted that in this case the zone of division between the seatings 153 and 157 is inclined, as in FIGURE 3. Around the casing 156 is an angle iron ring 158 and to this is bolted a casing 159 for an out-of-baalnce weight driven by shaft 160 through a flexible hose connection 161 from a petrol motor 162. The motor 162 is a light weight motor of the kind frequently used on small power-driven lawn mowers and it is supported between two of the legs 151.

So constructed, the whole machine is too light to be quite steady when operating, if the tube 154 is inflated with air, but if it is filled with water, this will add about 45 lbs. to the weight and the machine will operate satisfactorily.

I claim:
1. In or for a vibratory screen the combination of:
   (a) a base,
   (b) a resilient deformable tubular annulus in plane having at least a component extending in the horizontal direction,
   (c) a vibratory frame carrying a screen surface,
   (d) first and second annular seatings engaging the annulus above and below the annulus respectively,
   (e) means to attach the first seating to the frame,
   (f) means to attach the second seating to the base, so that the vibratory frame is supported on the base by means of the resilient annulus,
   (g) an out-of-balance weight, means supported on said base for rotating said weight,
   (h) means to attach the out-of-balance weight to the frame for rotation about an axis having at least a component perpendicular to the plane of the annulus the arrangement being such that both the seatings and the annulus surround the line of action of the center of gravity of the vibratory frame.

2. A screen as claimed in claim 1 wherein the annulus is hollow and filled with a fluid, either a gas or a liquid.

3. A screen as claimed in claim 1 wherein a plurality of out-of-balance weights are attached to the vibratory frame, means being provided to operate the weights in synchronized phase-relationship with one another.

4. A screen having the features claimed in claim 1 wherein the screen surface is horizontal, there are two co-axial sets of ring-shaped seatings and flexible annuli, one above the other, and there is an assembly of a plurality of screens delivering material one to another in cascade surrounded by the annuli and supported thereby.

5. A screen having the features of claim 1 wherein the screen surface is elongated and inclined so as to be higher at one end than the other.

6. A screen as claimed in claim 1 wherein the upper of the ring-shaped seating has a wall extended more deeply downward on the inner side than on the outer and wherein the lower seating has a wall extending higher upward on the outer side than on the inner side.

7. A screen as claimed in claim 1 wherein the entire weight of the vibratory frame is supported by the annulus.

8. A screen as claimed in claim 1 in which the vibratory frame carrying the screen surface is circular and is mounted co-axially with the resilient deformable annulus.

References Cited

UNITED STATES PATENTS

| | | | | |
|---|---|---|---|---|
| 2,848,110 | 8/1958 | Hurst | 209— | 366.5 X |
| 3,347,374 | 10/1967 | Frei | 209— | 322 |
| 3,257,040 | 6/1966 | Dumbaugh | 209— | 315 X |
| 199,125 | 1/1878 | Tolhurst | 248— | 22 |
| 1,388,967 | 8/1921 | Noble | 248— | 22 |
| 2,284,671 | 6/1942 | Meinzer | 209— | 325 |
| 2,946,440 | 7/1960 | Simpson | 209— | 366 X |
| 2,985,281 | 5/1961 | Carrier | 198— | 220 |
| 3,003,635 | 10/1961 | Wood | 209— | 415 |
| 3,008,703 | 11/1961 | Slemmons | 248— | 358 X |
| 3,032,200 | 5/1962 | Miller | 209— | 332 X |
| 3,101,315 | 8/1963 | Denovan | 209— | 332 |
| 3,238,674 | 3/1966 | Moore | 248— | 22 X |
| 3,261,592 | 7/1966 | Dumbaugh | 259— | 72 X |

FOREIGN PATENTS 605,864 2/1926 France.
656,567 3/1932 Germany.

HARRY B. THORNTON, *Primary Examiner.*
ROBERT HALPER, *Assistant Examiner.*

U.S. Cl. X.R.

209—332, 366.5; 248—22